(12) United States Patent
Ohta

(10) Patent No.: US 7,280,249 B2
(45) Date of Patent: Oct. 9, 2007

(54) IMAGE PROCESSING DEVICE HAVING FUNCTIONS FOR DETECTING SPECIFIED IMAGES

(75) Inventor: Ken-Ichi Ohta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 10/171,625

(22) Filed: Jun. 17, 2002

(65) Prior Publication Data

US 2002/0196465 A1    Dec. 26, 2002

(30) Foreign Application Priority Data

Jun. 26, 2001  (JP) ............... 2001-193556
Jun. 7, 2002   (JP) ............... 2002-167657

(51) Int. Cl.
  *H04N 1/32*    (2006.01)
  *H04N 1/387*   (2006.01)

(52) U.S. Cl. ............... 358/1.9; 358/1.14; 358/1.16

(58) Field of Classification Search ............. 358/1.16, 358/1.15, 501, 296, 405, 444, 1.9, 1.14, 524, 358/468; 382/166, 100, 135, 181; 713/176; 705/54; 399/366
See application file for complete search history.

(56) References Cited

U.S. PATENT DOCUMENTS

| 5,216,724 A | 6/1993 | Suzuki et al. ............... 382/7 |
| 5,227,871 A | 7/1993 | Funada et al. ............... 358/75 |
| 5,321,470 A | 6/1994 | Hasuo et al. ............... 355/201 |
| 5,363,202 A | 11/1994 | Udagawa et al. ............ 358/501 |
| 5,363,454 A | 11/1994 | Udagawa et al. ............. 382/17 |
| 5,430,525 A | 7/1995 | Ohta et al. ................ 355/201 |
| 5,481,377 A | 1/1996 | Udagawa et al. ............ 358/501 |
| 5,633,952 A * | 5/1997 | Outa et al. ................. 382/165 |
| 5,640,467 A * | 6/1997 | Yamashita et al. ........... 382/181 |
| 5,737,454 A * | 4/1998 | Park et al. .................. 382/284 |
| 5,781,653 A * | 7/1998 | Okubo ........................ 382/135 |
| 5,847,849 A | 12/1998 | Funada et al. .............. 358/530 |
| 5,917,938 A | 6/1999 | Funada et al. .............. 382/165 |
| 6,346,989 B1 | 2/2002 | Funada et al. .............. 358/1.14 |
| 6,389,170 B1 * | 5/2002 | Kawasaki et al. ........... 382/232 |
| 6,839,146 B1 | 1/2005 | Ishida et al. ............... 358/1.14 |
| 6,975,421 B1 * | 12/2005 | Hashimoto et al. .......... 358/1.16 |
| 2001/0040699 A1 * | 11/2001 | Osawa et al. ............... 358/1.17 |

FOREIGN PATENT DOCUMENTS

| JP | 4-207466    | 7/1992 |
| JP | 07-123249   | 5/1995 |
| JP | 2000-287081 | 10/2000 |

* cited by examiner

*Primary Examiner*—Scott A. Rogers
(74) *Attorney, Agent, or Firm*—Fitzpatrick, Cella, Harper & Scinto

(57) ABSTRACT

With a photocopier which stores original images read with a scanner in page memory, and prints later, in the event that judgment is made by a specified original judging unit that a specified original image is contained in an original document scanned for printing, the image signals stored in the memory are substituted with substitution image signals stored beforehand, and then output to a printer unit.

6 Claims, 11 Drawing Sheets

IMAGE PROCESSING DEVICE HAVING FUNCTIONS FOR DETECTING SPECIFIED IMAGES

BACKGROUND OF THE INVENTION

1. Field of the Invention

The present invention relates to an image processing device having forgery preventing function for preventing unauthorized reproduction of specified images regarding which duplication is forbidden, such as paper currency.

2. Description of the Related Art

A so-called color photocopier such as shown in FIG. 1 is known as a system for digital reading images of color originals and generating duplicate images.

In FIG. 1, an image scanner unit 1001 reads the original images and performs digital signal processing. Also, a printer unit 1002 performs full-color printer output of an image corresponding to the original image read by the image scanner 1001 on recording paper.

At the image scanner 1001, an original 1004 placed between a pressing plate 1000 having an original pressing face which has been subjected to mirror finishing and an original table glass 1003 is irradiated by the light of a lamp 1005. The reflected light from the original 1004 is guided to mirrors 1006, 1007, and 1008, and forms an image on a 3-line solid-state imaging device (hereafter referred to as "CCD") 1010 by a lens 1009. The three image signals red (R), green (G), and blue (B), output from the CCD 1010 are sent to a signal processing unit 1011. Here, the lamp 1005 and mirror 1006 are mechanically moved at a speed V in a perpendicular direction as to the electric scanning (main scanning) direction of the CCD 1010, and the mirrors 1007 and 1008 at a speed V/2, thereby scanning the entire surface of the original 1004 (sub-scanning). The image on the original 1004 is read at a resolution of 400 dpi in both main scanning and sub-scanning.

The signal processing unit 1011 electrically processes the input image signals so as to divide into the components of magenta (M), cyan (C), yellow (Y), and black (K), and sends CMYK image signals to the printer unit 1002. One color component of M, C, Y, and K, is sent to the printer unit 1002 for each time the original is scanned by the image scanner 1001, so one printout is completed by the original being scanned a total of four times.

At the printer unit 1002, the C, M, Y, or K image signals input from the image scanner unit 1001 are sent to a laser driver 1012. The laser driver 1012 performs modulation driving of a semiconductor laser device 1013 according to the input image signals. The laser beam output from the semiconductor laser device 1013 scans over a photosensitive drum 1017 via a polygon mirror 1014, f-θ lens 1015, and mirror 1016, so as to form a 400 dpi electrostatic latent image on the photosensitive drum 1017 for the main scan and sub-scan.

A rotating developer 1018 is configured of the magenta developing unit 1019, a cyan developing unit 1020, a yellow developing unit 1021, and a black developing unit 1022, with the four developing units alternately coming into contact with the photosensitive drum 1017, thereby developing the electrostatic latent image formed on the photosensitive drum 1017 with toner. A transfer drum 1023 has recording paper, supplied from recording sheet cassettes 1024 or 1025, wrapped thereupon, and the toner image formed on the photosensitive drum 1017 is transferred onto the recording paper.

Thus, the four color toner images of M, C, Y, and K, are sequentially transferred on the recording paper, following which the recording paper passes through a fixing unit 1026, and the recording paper with toner fixed thereupon is discharged out of the apparatus.

As described in U.S. Pat. Nos. 5,321,470, 5,216,724, 5,633,952, 5,430,525, 5,227,871, etc., with a color photocopier of such a configuration, the signal processing unit 1011 is arranged such that image signals representing an original image are analyzed, judgement is made regarding whether or not there are specified original images regarding which duplication is forbidden, such as paper currency (hereafter referred to as "specified original judging"), and in the event that judgement is made that a specified original image exists therein, the image output from the printer unit 1002 is filled in such that correct duplication result cannot be obtained, by substituting the image signals sent to the printer unit 1002 with, for example, a predetermined value that is not dependent on the original image, or the like. As described above, the configuration shown in FIG. 1 reads the original image four times repeatedly, so acts of forgery can be prevented before they occur, by, for example, performing the specified original judging at the time of reading the first time, and formation of the M color component latent image, in parallel, so in the event that judgement is obtained that a specified original image does exist, the laser driving signals (image signals) of the subsequent C, Y, and K color components are substituted with a predetermined value, thereby coloring the entire output image practically black.

With the above-described color photocopier, there is basically the need for the image scanner unit 1001 which reads original images and the printer unit 1002 which outputs photocopied images, to operate synchronously. That is to say, the RGB image signals output from the CCD 1010 are processed at the signal processing unit 1011 one pixel at a time and converted into CMYK image signals, sent to the printer unit 1002 sequentially, and form an electrostatic latent image on the photosensitive drum 1017. Image formation is performed for one of the color components M, C, Y, and K, the image formation process is repeated for each of the color component, and original image reading is performed four times consecutively. Accordingly, the image output at the end can be colored in so long as the specified original judgment is performed by at least the third scan of the four scans.

Also, with the above-described color photocopier configuration, the image scanner unit 1001 and the printer unit 1002 need to operate at the same time. For example, in the event that the fixing unit 1026 is a normal thermal fixing type, and the heater is not sufficiently heated, the printer unit 1002 will go into standby, so photocopying and image reading cannot be performed.

In the event of photocopying multiple copies of an original image with the configuration of the above-described color photocopier, there is the need to read the image multiple times according to the multiple copies to be output. Further, in the event that there are multiple originals, the originals need to each be read multiple times, so the time required for photocopying color originals is great.

Now, there is a configuration wherein page memory for storing at least one page worth of color image that has been read is provided in the image scanner unit 1001, and the photocopy images output by reading out the image from the page memory four times repeatedly, thereby enabling multiple outputs with reading the image only one time. With such a configuration, reading the image just one time is sufficient even in the event of outputting multiple copies of the original, so the time required for photocopying color originals can be reduced.

In the event that the image scanner unit 1001 has page memory, the specified original judging is performed during one original scan in parallel with reading of the image. At the point that judgement is made that there is a specified original image, the image is already stored in the page memory. Accordingly, in the event that this image is read out of the page memory by some sort of means, this consequently permits photocopying of the specified original. Of course, a configuration could be made wherein that image output is colored in with a predetermined value at the point that judgement is made that the specified original exists. However, normally, with configurations having page memory, image reading and image output are performed asynchronously, so that apparatus may be out putting an image completely unrelated with this while scanning the original containing the specified original image. In this case, another image output which is not the image to be colored in, will be colored in.

Also, an arrangement may be conceived wherein the image stored in the page memory can be deleted at the point that judgement is made that a specified original image exists. However, with this arrangement, no image output corresponding to the read image is performed at all, so there is no record that an unauthorized act was committed, which is undesirable in operating the apparatus.

SUMMARY OF THE INVENTION

Accordingly, it is an object of the present invention to provide an image processing device which solves the above-described problems.

It is another object of the present invention to provide an image processing device which, with an image processing device having memory which stores images to be printed, image signals containing specified original images and be suitable processed in the event that original images read and stored in memory are output to an image forming device.

Further objects, features and advantages of the present invention will become apparent from the following description of the preferred embodiments with reference to the attached drawings.

DESCRIPTION OF THE PREFERRED EMBODIMENTS

Preferred embodiments of the image processing device according to the present invention will now be described in detail in accordance with the accompanying drawings.

First Embodiment

Figure 1:
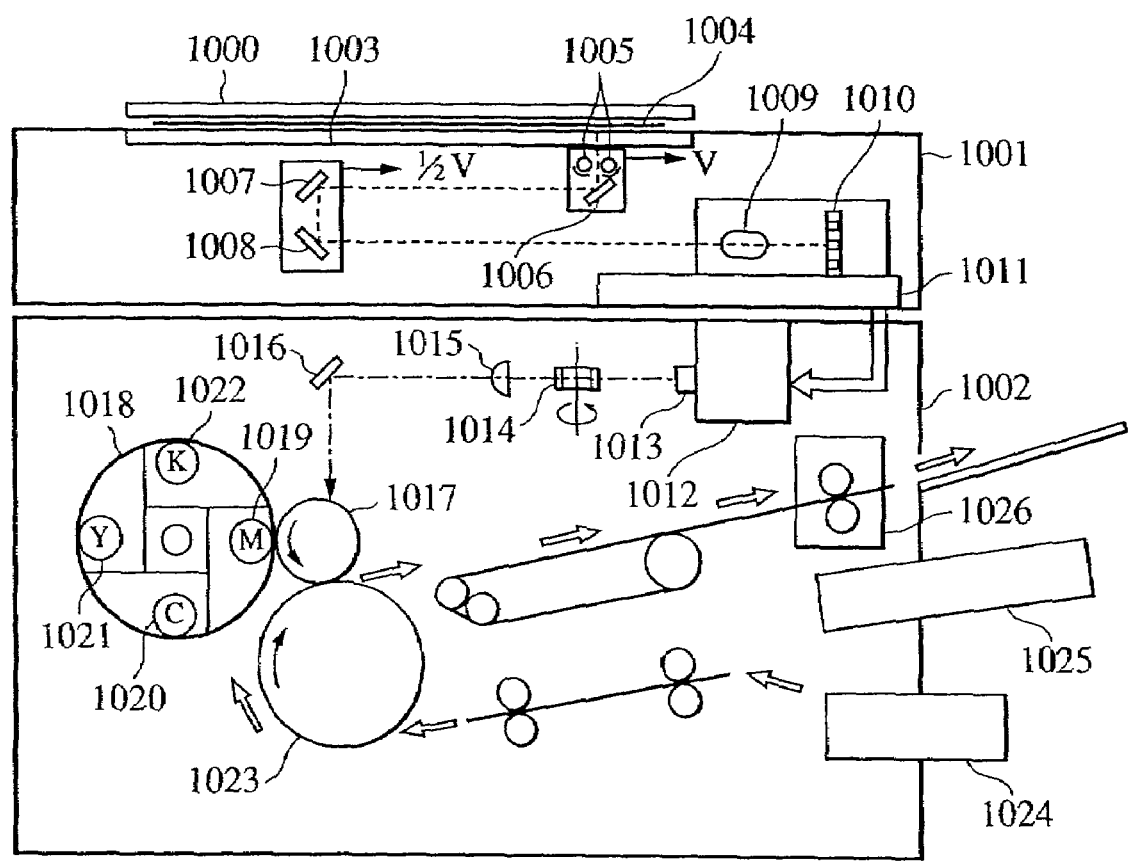
FIG. 1 is a diagram describing a configuration example of a color photocopier.
Figure 2:
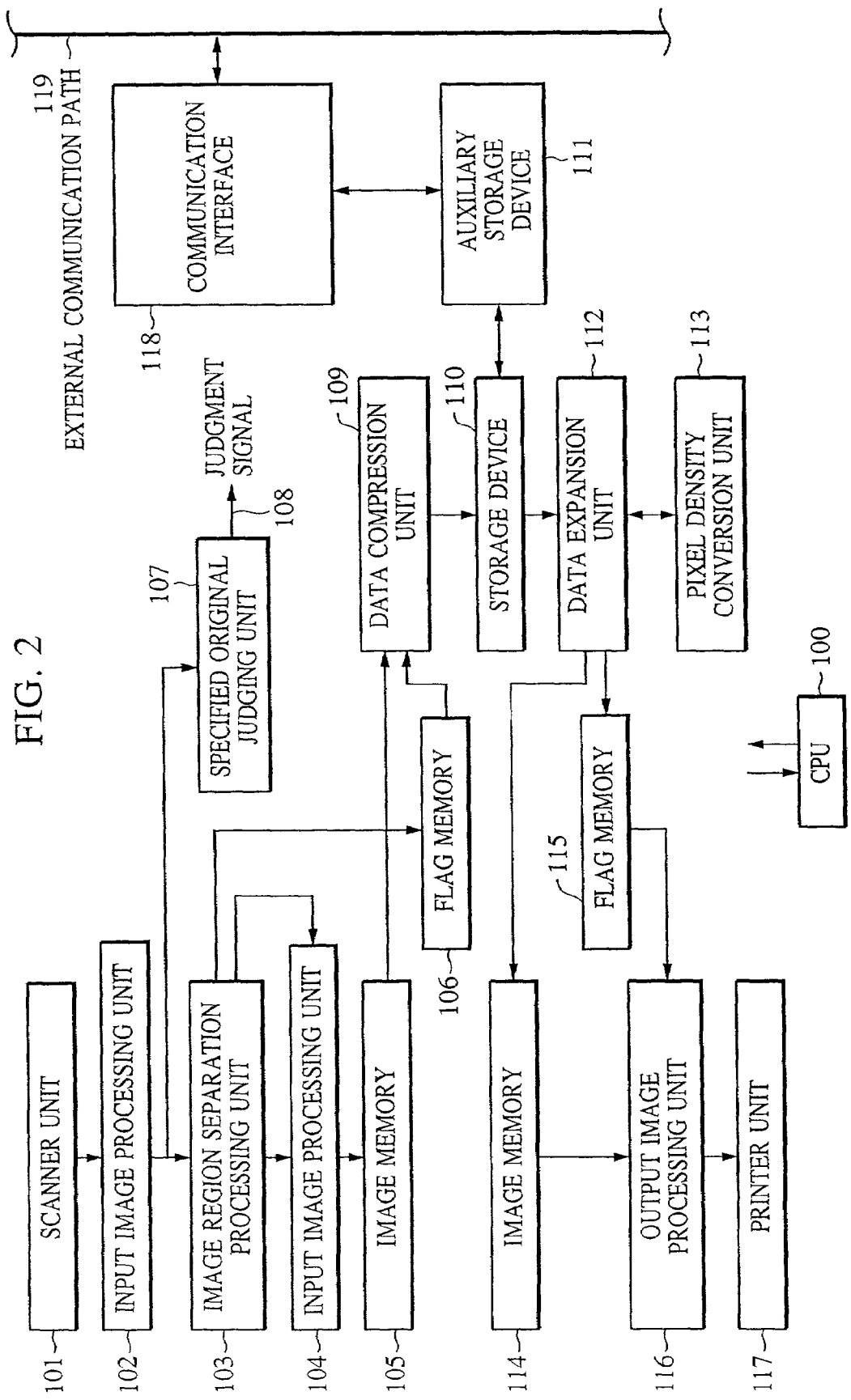
FIG. 2 is a block diagram illustrating a configuration example of an image processing device according to a first embodiment.

FIG. 2 is a block diagram illustrating a configuration example of an image processing device according to an embodiment.

[Image Reading]

A scanner unit 101 reads an original image with a CCD, and sends color image signals (RGB image signals) corresponding to the read image, to an input image processing unit 102. The input image processing unit 102 subjects the color image signals sent from the scanner unit 101 to known image processing such as shading correction, CCD line correction, and color correction.

An image region separation processing unit 103 performs image region separation processing of color image signals input from the input image processing unit 102. That is to say, this detects characteristics of the image such as photograph regions, text regions, and halftone regions, for each of the pixels of the input image, and generates flag data representing the attributes of each image region.

[Image Region Separation Processing]

Image region separation processing is processing for generating signals indicating image region attributes by extracting characteristics of the image (hereafter referred to as "flag data"), in order to perform optimal image processing according to the characteristics of the image. Often, various types of the image regions exist in a mixed manner in the original image, such as full-color photograph regions with continuous gradients, black and white text regions, and halftone print regions such as with newspaper printing, and so forth. Subjecting these image areas to the same image processing generally will not yield image output of desirable image quality. Accordingly, color image signals are used, and image regions contained in the original image are detected, and flag data for identifying these is generated.

Figure 3:
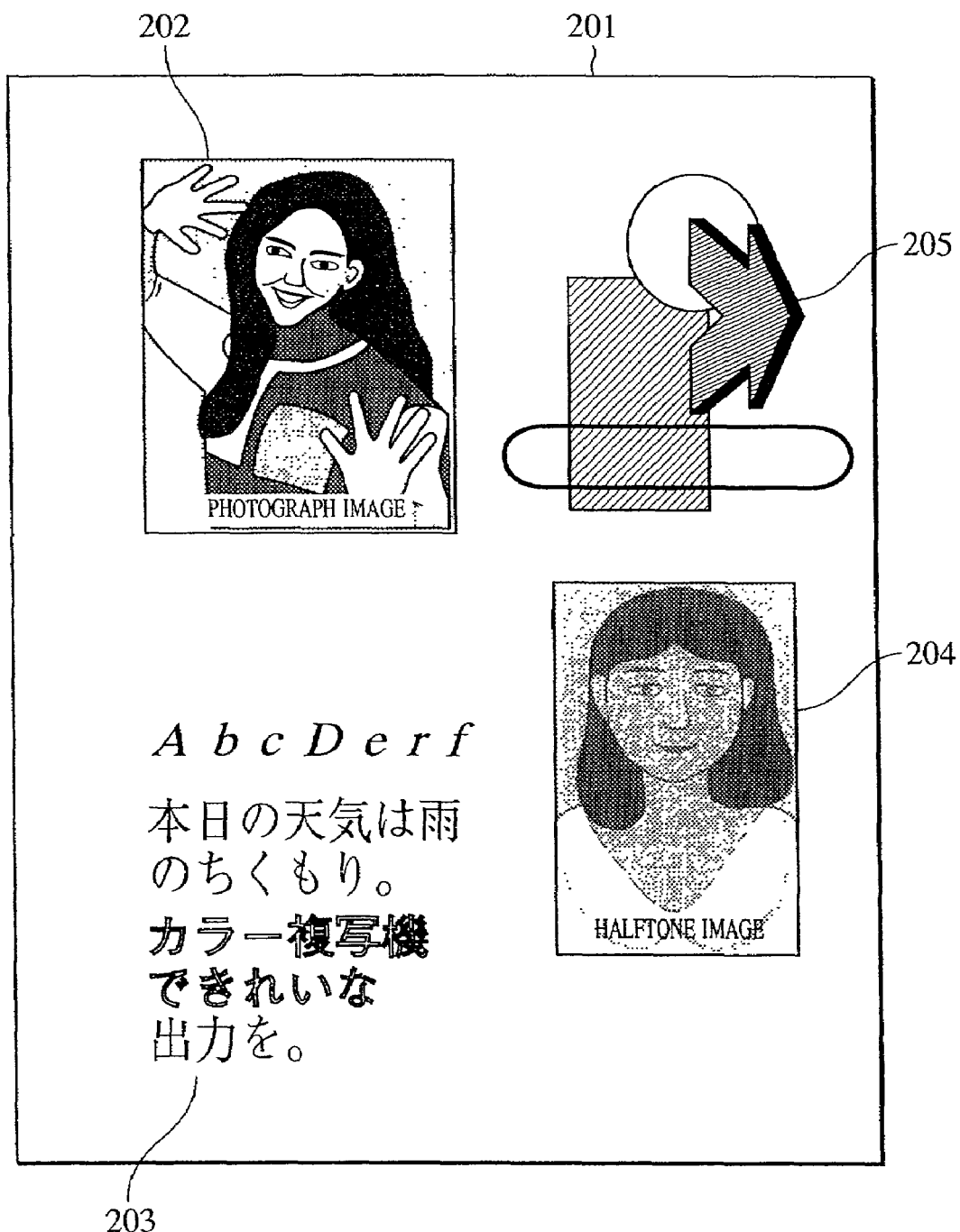
FIG. 3 is a diagram illustrating an example of an original image.
Figure 4A:
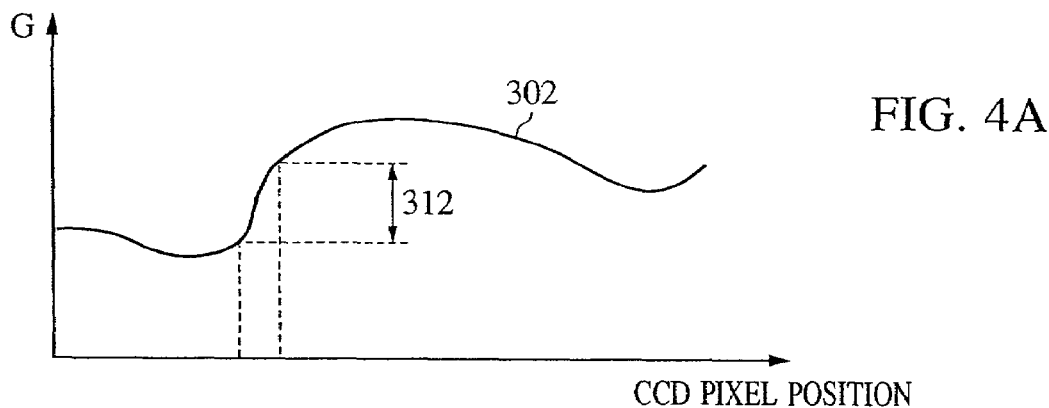
FIG. 4 is a diagram describing characteristics determined according to the image areas of image signals obtained by reading an original image.
Figure 4B:
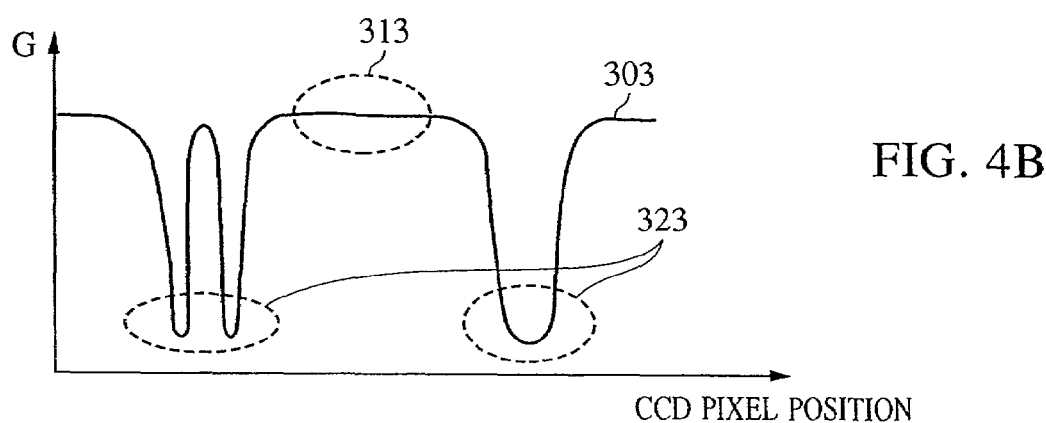
Figure 4C:
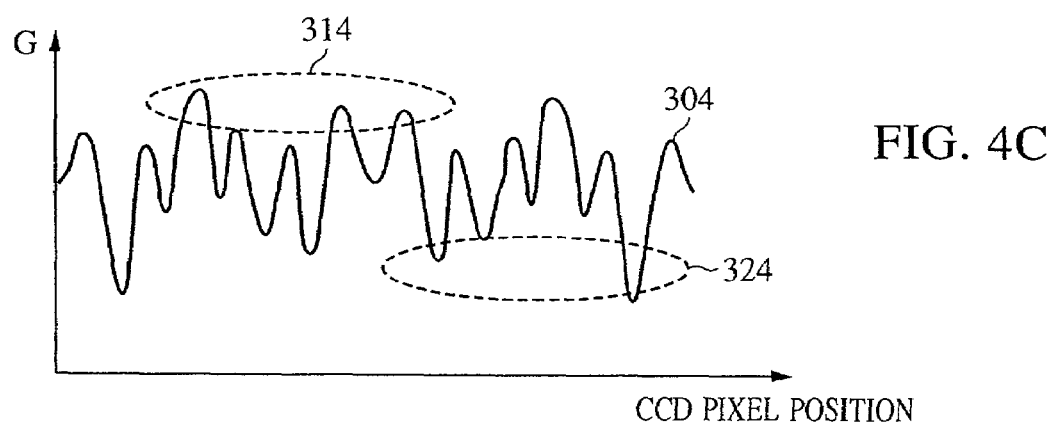
Figure 4D:
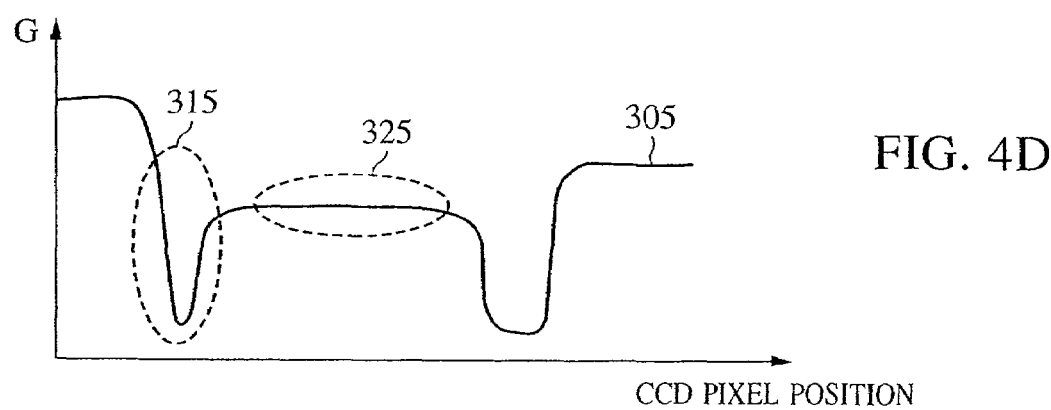

FIG. 3 is a diagram illustrating an example of an original image, with a photograph region 202, black text region 203, halftone print region 204, and color graphics region 205, all existing within a single page of the original 201.

Color image signals obtained by the scanner unit 101 reading this original image have characteristics determined according to the image region. Of the signal values read in each region, plotting the G signals in the array direction of the CCD yields the curves shown in FIGS. 4A through 4D. In FIGS. 4A through 4D, the curves 302, 303, 304, and 305 each represent examples of properties manifested characteristically for reading certain lines in the image regions 202 through 205 in FIG. 3.

Note that the horizontal axis of the graphs shown in FIG. 3 represent the pixel positions in the CCD array direction, and the vertical axis represents the signal value, with the vertical axis indicating that the higher the position is, the closer to white (i.e., bright) the pixel is.

Describing the characteristics of each image region, at the photograph region 202, change in signal values according to pixel location is relatively smooth, and the differences 312 between signal values in close proximity exhibit small values. In the black text region 203, black characters are drawn owned a white background, so the signal values have properties that drastically changed from the white background portion 313 to the character portion of 323. In the halftone region 204, the change in signals values has properties wherein bright and dark change is repeated at a high frequency as indicated by the curve 304 shown in FIG. 4C, since halftone patterns 324 printed on the white background are repeated. In the graphics region 205, the signal value rapidly becomes smaller at the edge portion 315 of the graphics, while maintaining an approximately constant value within the graphics portion 316.

These images regions can be judged by detecting the above-described characteristics from the image signals, and discerning which attributes they correspond to. Accordingly, characteristics extracting methods using known techniques, such as the accumulation of values of amount of change of signal values near a pixel of interest or amount of change in a predetermined section, luminance values of surrounding pixels (whether white or colored backgrounds), the number of light and dark changes of signal values within a predetermined section, etc., and known attributes judging techniques are used based thereupon.

Upon image region attributes being detected for each pixel by the above-described image region separation processing, image processing corresponding to the image region attributes is executed at a No. 2 input image processing unit 104. For example, in the text region, the high-frequency component of the image is enhanced in order to increase sharpness of characters, and at the halftone region, so-called low-pass filter processing is performed for eliminating moiré components characteristic of halftone images. Such processing can be switched over in increments of pixels according to the flag data generated by the image region separation processing unit 103.

[Accumulation of Image Data]

The color image signals subjected to the above-described various types of input image processing, and the flag data generated in the above procedures, are temporarily stored in image memory 105 and flag memory 106, respectively. At this time, the color image signals and the flag data are stored for an entire page of the original, or a predetermined region portion of one page.

The temporarily stored color image signals and flag data are compressed by data compression unit 109 and stored in a storage device 110. The storage device 110 is preferably a high-speed storing means such as a semiconductor storage device or the like. Also, the data compression unit 109 performs a different data compression processing for the color image signals and the flag data. That is, image data is subjected to data compression processing such as JPEG compression, which is irreversible, but compresses data with a high compression percentage without perceivable deterioration of the image according to human visual properties. Also, the flag data is subjected to reversible data compression such as JBIG decompression, so that there is no drop-out or change in the flag data.

Thus, the color image signals and flag data that have been subjected to different compression processing are stored in the storage device 110 in increments of pages of the originals. The compressed data stored in the storage device 110 may be written to an auxiliary storage device 111. For the auxiliary storage device 111, a medium with a large storage capacity, such as a hard disk, is suitable, even if the recording speed is somewhat slower. This allows multiple pages of the original images to be effectively stored in the auxiliary storage device 111.

[Specified Original Judging]

Concurrently with the above image reading, image region separation processing, and image data accumulation, the specified original judging unit 107 performs specified original judgment. That is, simultaneously with the color image signals subjected to basic image processing at the input image processing device 102 being sent to the image region separation processing unit 103, these are also sent to the specified original judging unit 107, judgement is made regarding whether or not the specified original image such as paper currency or the like that has been registered beforehand is contained therein, and judgment signals 108 indicating the judgement results thereof are generated. The judgment signals 108 are sent to the CPU 100 controlling the entire apparatus, and so forth.

Known technology is used for the specified original judging method, wherein color attributes, 2-dimensional pattern attributes, etc., are extracted from the color image signals sent in time-sequence, the degree of approximation thereof with the color attributes, pattern attributes, etc., of specified original image is registered in the memory in the specified original judging unit 107 beforehand (i.e., the degree of matching) is calculated, and in the event that the degree of approximation is at a predetermined value or higher, the judgment signal 108 representing that the specified original image exists, is output (e.g., Japanese Patent Laid-Open No. 4-207466, etc.).

Here, specified original judgment is being performed concurrently with the reading and storing of the image, so the specified original judgment is completed at the same time that the reading of one page of the image of the original is completed. Accordingly, in the event that the judgment signal 108 indicating that there is a specified original image therein is output, an unshown CPU substitutes substitution image signals stored in the storage device 110 or the auxiliary storage device 111 beforehand for the image signals that have been judged and stored in the storage device 110 or the auxiliary storage device 111.

Substitution image signals are, for example, image signals which color in the entire page black. Compressing such image signals beforehand and storing these in the storage device 110 or auxiliary storage device 111 enables substitution with the image signals having been judged.

Substitution image signals have a uniform value for the entire page, so the compressed data size is extremely small, and does not waste any storage space on the storage device 110 or auxiliary storage device 111. Note that the image signals for substitution may be smaller than the entire page size. In this case, substitution image signals can be repeatedly output for the entire page.

Substitution of image signals can be realized by a method wherein the image signals stored in the storage device 110 or auxiliary storage device 111 are first deleted and then over written by the substitution image signals.

Figure 5:
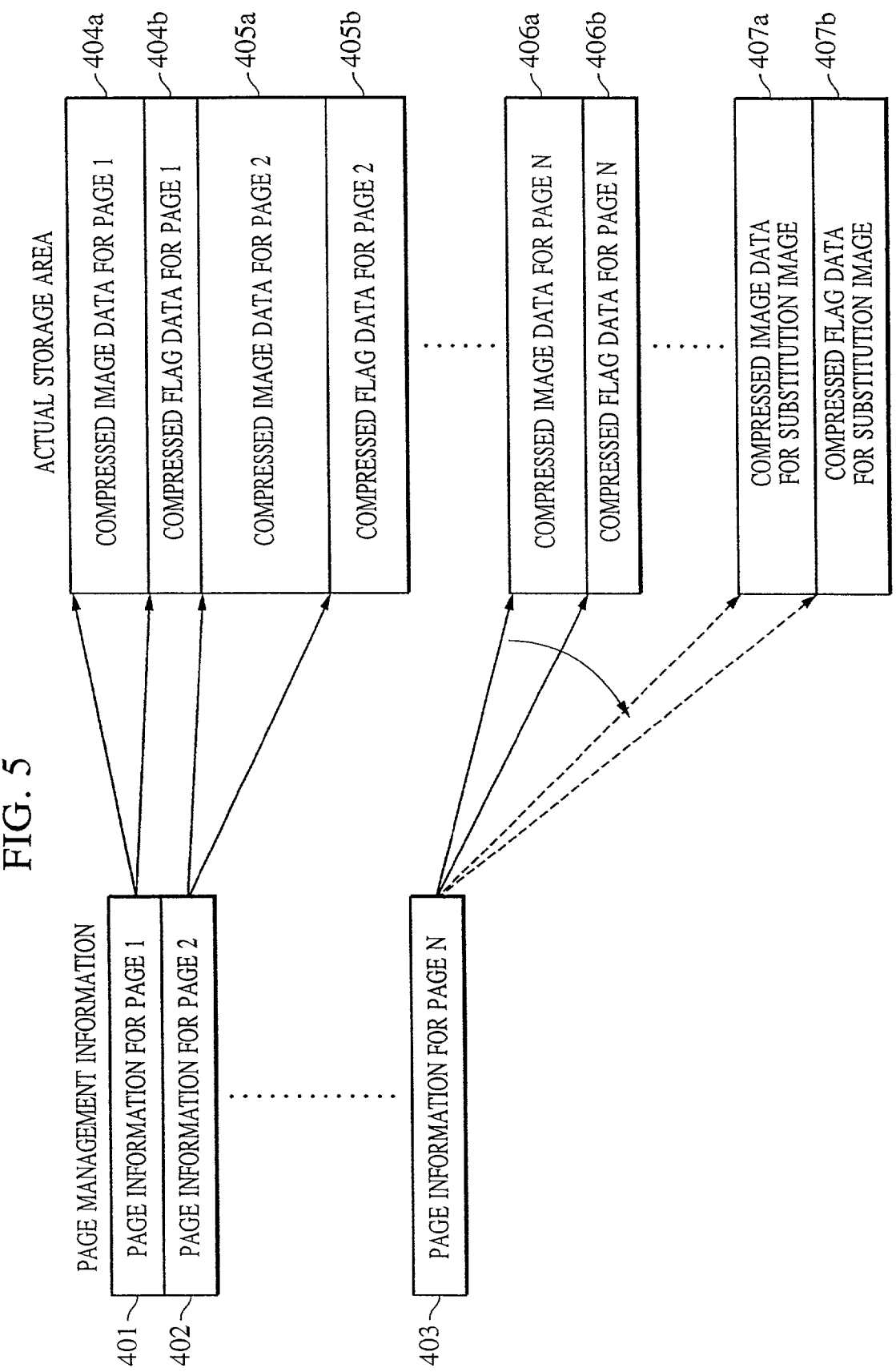
FIG. 5 is a diagram describing page management information.

Also, as shown in FIG. 5, the image signals can be substituted by rewriting address information indicating the actual storage region of the storage device 110 or auxiliary storage device 111 that is written in the page management information managing multiple pages of image signals written to the storage device 110 or auxiliary storage device 111.

In the event of managing image signals for multiple pages, normally, the CPU 100 stores the page management information for the multiple pages in work memory or the like, as indicated by reference numerals 401, 402, and 403, in FIG. 5, and holds the actual storage region location information regarding where the image signals exist, in the page management information. That is to say, the page management information 401 shown in FIG. 5 stores information indicating the actual storage region 404a of the compressed image signals and actual recording region 404b of the compressed flag data (leading position). In the same way, the page management information 402 stores information indicating the actual storage regions 405a and 405b of the second page, and so forth own through the page management information 403 storing information indicating the actual storage regions 406a and 406b of the N'th page.

Substitution image signals are stored in an actual storage region determined beforehand, and page management information of pages judged that specified original images exist therein are substituted. That is, the page management information is rewritten so as to refer to the actual storage regions 407a and 407b where the substitution image signals are stored. Note that FIG. 5 illustrates an example wherein judgment is made that a specified original image exists in the N'th page, and the page management information 403 of the N'th page is substituted.

Further, all flag data for the substitution image signals can be left at "0". However, flag data only indicates the attributes information for each pixel within the images, so the actual original image regarding which duplication is forbidden, cannot be printed out thereby. Accordingly, an arrangement may be made wherein no flag data is substituted, and only the image signals are substituted. In this case, there is no need to prepare substitution flag data.

[Reading Out Image Data]

The compressed image data and attributes flag data stored in the storage device 110 or auxiliary storage device 111 are read out for output to the print unit 117, each expanded at the data expanding unit 112, and respectively written to the image memory 114 and flag memory 115. At this time, the above-described page management information is referred to in order to read out the image signals that have been compressed. Accordingly, with regard to pages that have been judged to contain specified original images, the above-described substitution image signals are read out instead, and stored in the image memory 114.

A pixel density conversion unit 113 converts the pixel density of the image signals that have been read out from the storage device 110 or auxiliary storage device 111, as necessary. This pixel density conversion unit 113 is used in cases such as enlarging or reducing an image for printing output, or reducing multiple pages of images and synthesizing the reduced images to make a printer output thereof on one page.

Figure 6:
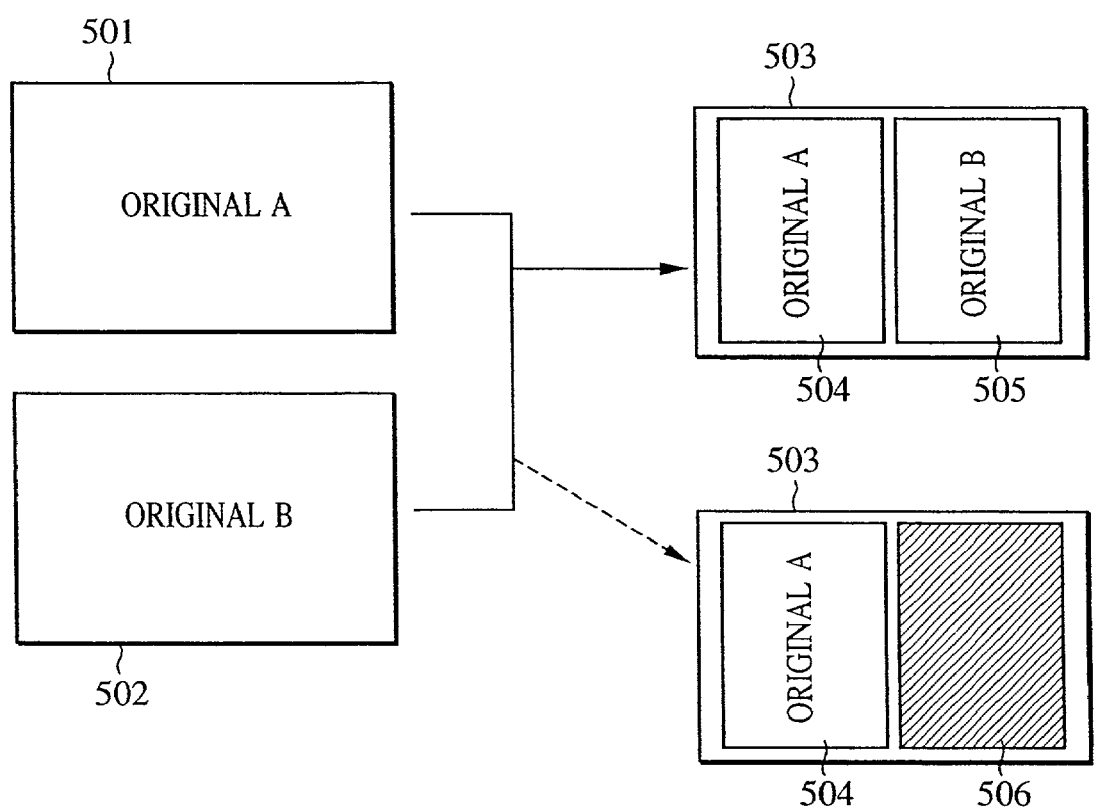
FIG. 6 is a diagram illustrating synthesized output of multiple pages.

FIG. 6 is a diagram illustrating an example of synthesized output of multiple pages. That is, saying that image signals from reading the images of two originals 501 and 502 are recorded in the recording device 110 beforehand, these are synthesized and printed on a recording sheet 503 of the same size as the originals, for example.

To this end, first, the image signals corresponding to the original 501 are read out from the storage device 110 and expanded, subjected to reduction processing of a predetermined percentage at the pixel density conversion unit 113, and image signals equivalent to the image 504 subjected to 90 degrees rotation in the counterclockwise direction at an unshown rotation processing unit are written to a predetermined area in the image memory 114. Next, image signals corresponding to the original 502 are read out from the storage device 110 and expanded, subjected to the same reduction processing, and the image signals equivalent to the image 505 subjected to rotation processing are written to the predetermined area in the image memory 114. At this time, the flag data corresponding to the original 501 and 502 is also subjected to the expansion, reduction, and rotation processing, and written to the corresponding area in the flag memory 115.

Now, it is preferable that different techniques be applied for resolution conversion of the image signals and resolution conversion of the flag data. For example, known techniques such as linear interpolation or bicubic spline interpolation can be used for the image signals. Also, for the flag data, resolution conversion methods suitable for the binary data, such as the nearest-neighbor processing or the like, is preferably used.

Due to the above processing, the image 504 and 505 equivalent to the two originals 501 and 502 are laid out and printed out on the same page 503, as shown in FIG. 6. However in the event that judgement is made that a specified original image is contained in, for example, the original 502, substitution image data is read out corresponding to the original 502, so the image that is laid out and printed out onto the same page as the image 506 equivalent to the original 502 colored in black, for example, as shown in FIG. 6.

In this way, images containing specified original images can be invalidated even in cases for synthesizing and printing out multiple images. However, in the event that reducing (or enlarging) processing is specified for the printout, an output image is formed with the original image reduced (or enlarged), so that the output printed image has a different size as compared to the original regarding which duplication is forbidden, and consequently, the object of forgery is not effected. Accordingly, a configuration may be conceived wherein the above-described in the substitution image is not performed in the event that an enlargement/reduction percentage of a certain degree (reduction of 70% or less, or enlargement of 140% or more) is specified.

[Output of Image Data]

Upon the data amount of the image signals and flag data temporarily stored in the image memory 114 and flag memory 115 reaching a predetermined amount, the image signals and flag data are sent to an output image processing unit 116.

The output image processing unit 116 performs known image processing for converting the RGB image signals into printing image signals, i.e., luminance concentration conversion, masking correction, UCR, gamma correction, quantization (including binarization) processing, etc., and the post-conversion CMYK image signals are output to the printer unit 117. The printer unit 117 drives the semiconductor laser device 1013 based on the CMYK image signals sent thereto, and forms a visible image on the recording paper following the above-described procedures.

The flag data stored in the flag memory 115 is used for switching over the processing of the output image processing unit 116. That is, the coefficients for masking correction and UCR processing are changed between the photograph region and text region, thereby making the output image quality suitable. For example, a conversion coefficient wherein pixels are reproduced only with black toner is applied for text regions, i.e., for pixels wherein the text flag is "1", in other words, a coefficient wherein C, M, and Y are 0, is applied for pixels wherein there is no color. Also, for the regions other than text region, coefficients are applied wherein C, M, and Y, are not 0 even in the event that there is no color, so as to reproduce a black with depth.

Also, quantization processing converts CMYK image signals into binary signals or the like of "0" and "1" using known error dispersion processing or dithering processing. At this time, error dispersion processing is applied for text regions and graph regions, since the clarity of the output image has priority, and dithering processing is applied for photographs and halftone regions, since the gradation has priority. Thus, the output image quality can be made suitable by a switching between quantization methods according to the flag data.

Figure 7:
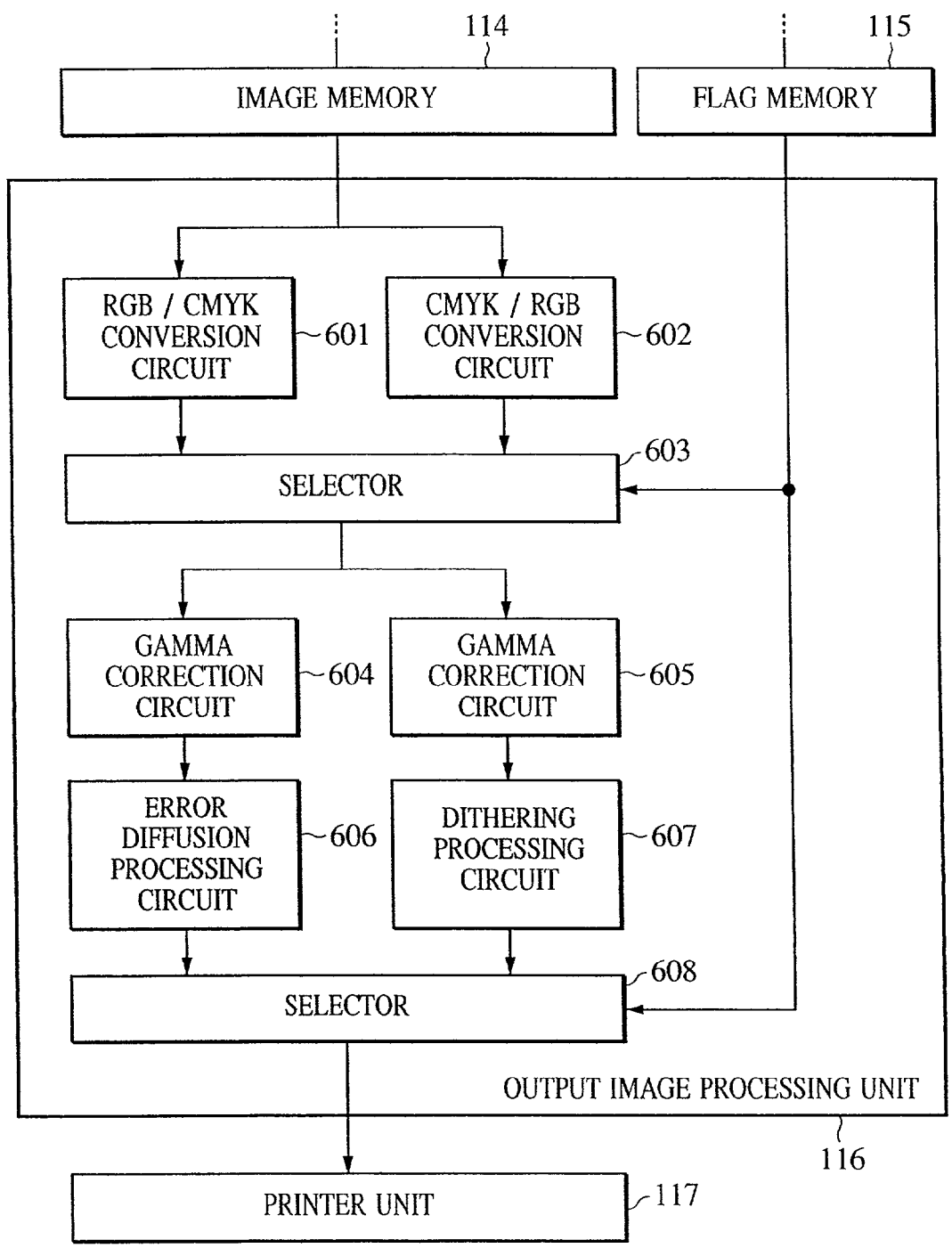
FIG. 7 is a block diagram illustrating a configuration example of an output image processing unit.

FIG. 7 is a block diagram illustrating a configuration example of the output image processing unit 116. The RGB image signals read out of the image memory 114 are input in parallel to two RGB/CMYK conversion circuits 601 and 602, independently subjected to luminance concentration conversion, masking correction, and UCR, thereby being converted into CMYK image signals. One output of the RGB/CMYK conversion circuits 601 and 602 is selected by a selector 603 following flag data read out of the flag memory 115, synchronously with RGB image signals. For example, text region conversion coefficients are set in the RGB/CMYK conversion circuit 601, and conversion coefficients for regions other than the text region are set in the RGB/CMYK conversion circuit 602. In the event that the flag data is "1", the selector 603 selects the output of the RGB/CMYK conversion circuit 601, and in the event that the flag data is "0", the selector 603 selects the output of the RGB/CMYK conversion circuit 602.

The output of the selector 603 is applied in parallel to a system of a gamma correction circuit 604 and error dispersion processing unit 606, and a system of a gamma correction circuit 605 and dithering processing unit 607. A selector 608 selects one of the output of both systems, which is sent to the printer unit 117. In the event that error dispersion processing is to be applied for the text region and graph region, the output of the error dispersion processing circuit 606 is selected in the event that the text flag is "1" or the shape flag is "1", and otherwise, the output of the dithering processing circuit 607 is selected.

Modifications

With the above-described embodiment, an example has been described wherein image signals containing specified original images are substituted with image signals which color in the entire page black, but the present invention is by no means restricted this, and may be substituted with image signals which color in the page with white or a specified color, or image signals which print a warning text which warns of illegal activity.

Also, an arrangement may be made wherein the image is not colored in, but flag data is substituted. In this case, flag data wherein the attributes of the entire page (text attributes, halftone attributes, etc.,) are all set to "1" is created, compressed, and stored in the storage device 110 or the like, as substitution flag data. In the event that an image is judged to contain a specified original image, the flag data of the problem page is substituted with the above-described flag data. At the time of printing out the page, the table of one of the RGB/CMYK conversion circuits shown in FIG. 7 (e.g., RGB/CMYK conversion circuit 602) is rewritten so as to constantly output black image signals regardless of the input image signals, and in the event that the value of flag data is all "1", the output of the RGB/CMYK conversion circuit 602 is selected. Thus, an image wherein the entire page is colored in black is output by substituting the flag data, without substituting the image signals.

Also, a configuration has been described wherein both the image signals and flag data are stored, but it is needless to say that there are cases wherein the flag data does not need to be stored in the storage device 110 or the like, and the above-described embodiment may also be applied to methods wherein only the image signals are stored.

Also, with the above embodiments, it is not essential to store substitution image signals equivalent to an image of the same size as the read image, in the storage device 110 or the like. The storage region for keeping the substitution image signals can be conserved by using an image which is far smaller than the read image size. For example, let us say that that output size of the image represented by the substitution image signals is 5 cm×5 cm. In the event that judgement is made that the specified original image is contained, the substitution image signals are repeatedly read out and continuously printed out, thus enabling the entire page to be colored in black.

Also, compressing the substitution image signals and flag data allows the resources of the storage device 110 to be effectively used. At this time, other compression methods including non-compression may be employed, besides the above-described compression methods.

With the above-described embodiment, description has been made wherein the image signals of the read image and the substitution image signals are handled in increments of pages. However, a configuration can be made wherein the image signals are divided into partial regions and stored, and image signals are substituted in increments of partial regions.

Figure 8:
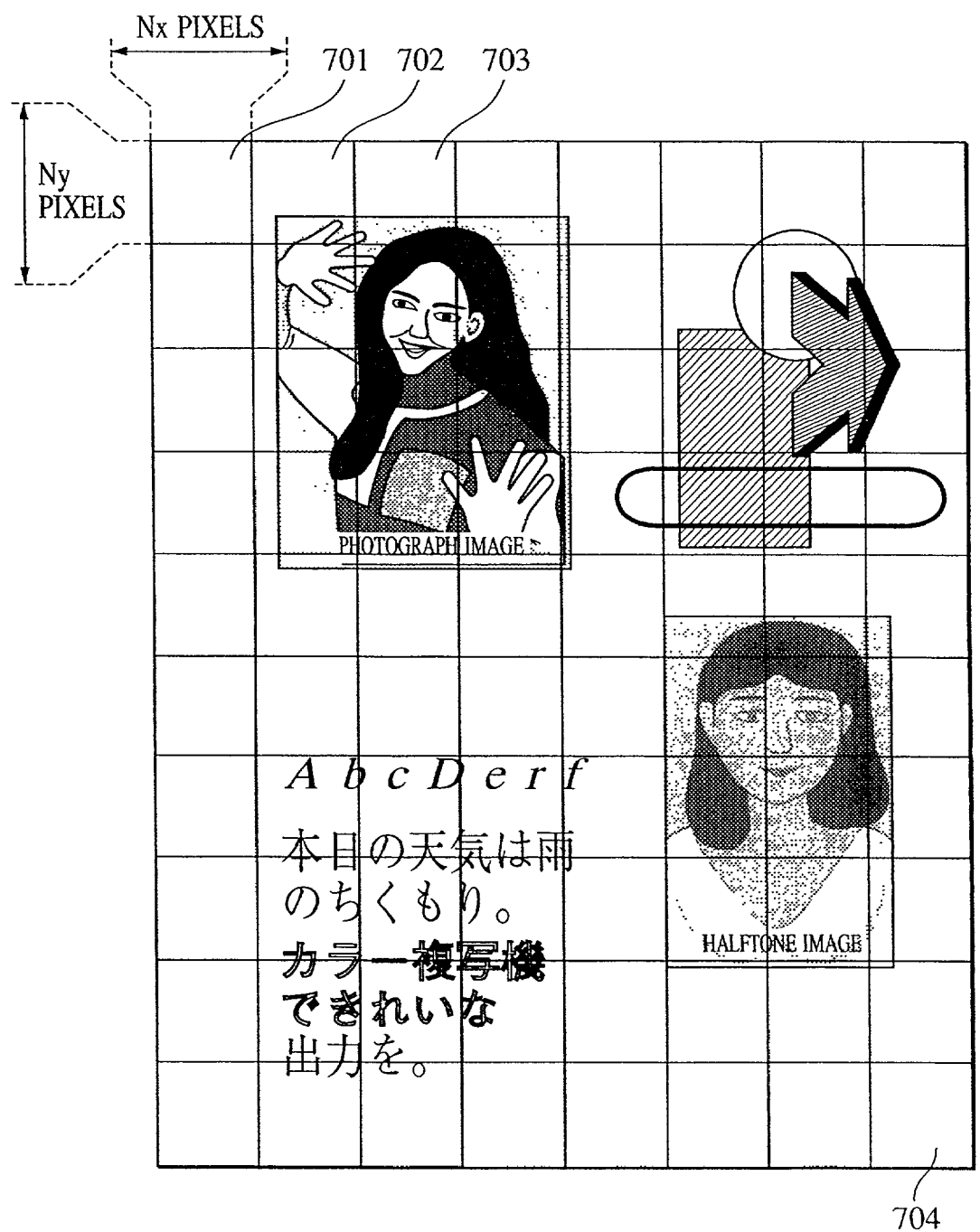
FIG. 8 is a diagram illustrating the manner in which a read image is divided into predetermined sizes.

FIG. 8 is a diagram illustrating dividing a read image into predetermined sizes. Image signals for one page are divided into rectangular regions of Nx pixels horizontally and Ny pixels vertically, the image is compressed in increments of the rectangular regions (hereafter referred to as "tiles"), so that the first tile 701, second tile 702, third tile 703, and so forth are sequentially stored in the storage device 110, up through the last tile 704. In the event of outputting the stored image signals, the compressed tiles are read out and expanded based on the stored order, reconstructed into raster data, and output to the printer unit 117 in increments of lines.

Figure 9:
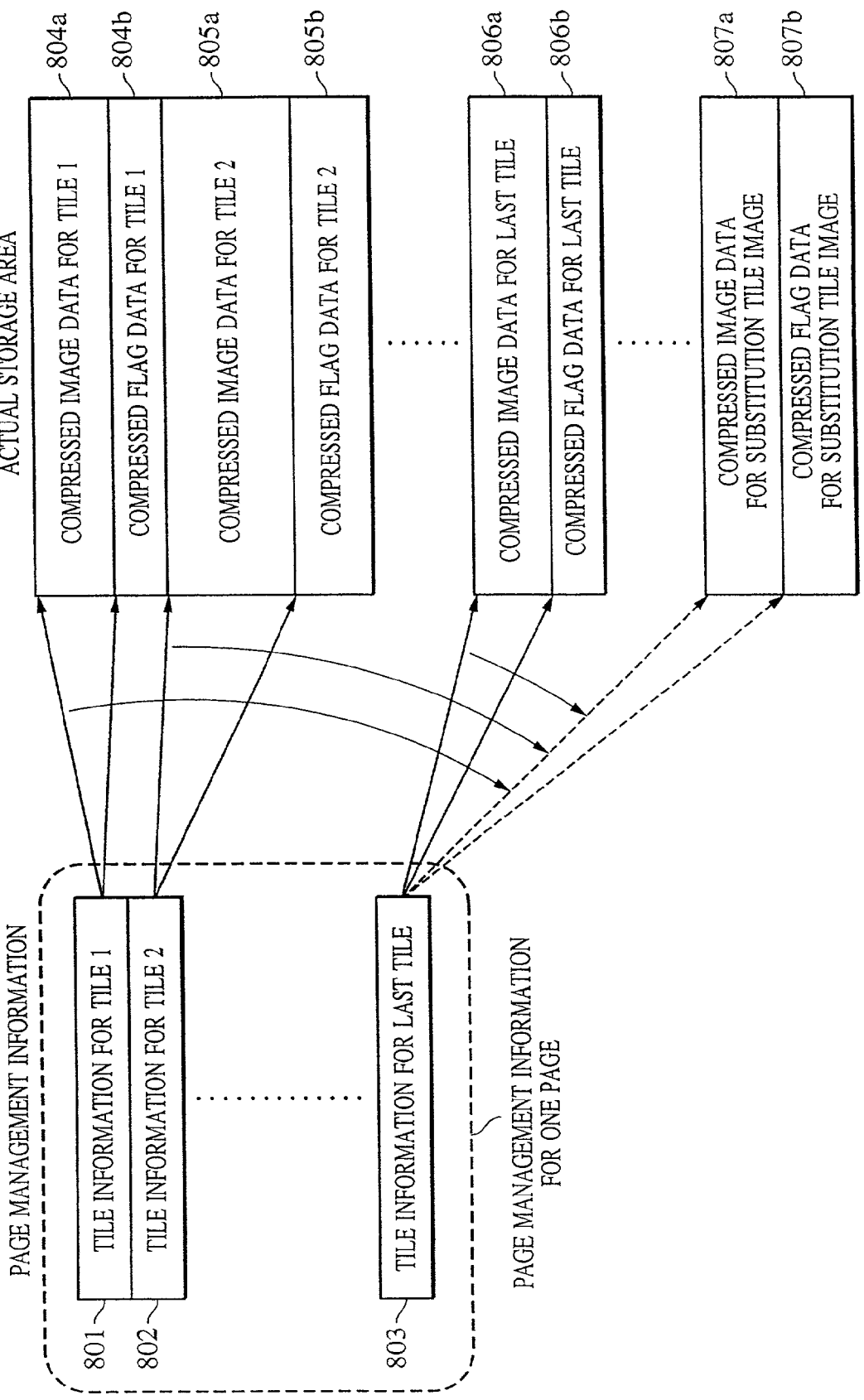
FIG. 9 is a diagram illustrating a configuration example of page management information stored in increments of tiles.

FIG. 9 is a diagram illustrating the configuration example of page management information stored in increments of tiles. Is generally the same as that shown in FIG. 5, but has a data management configuration in increments of titles instead of management in increments of pages as shown in FIG. 5. That is, the header information 801 of the first tile stores the location (position) information of the actual storage region 804a where the compressed image data of the first tile and the location (position) information of 804b where the compressed flag data of the first tile are stored, the header information 802 of the second tile stores the location (position) information of the actual storage region 805a where the compressed image data of the second tile and the location (position) information of 805b where the compressed flag data of the second tile are stored, and so forth, so that the header information of all of the tiles making up one page through the header information 803 of the last tile, is stored as one set of page management information. The substitution image data and flag data are stored in the actual storage regions 807a and 807b beforehand.

In the event that judgement is made that a specified original image is contained, the location information held by the header information of all tiles is rewritten so as to point to the actual storage regions 807a and 807b storing the substitution image data. Thus, the image data corresponding to all titles is substituted with substitution image data, and image signals read out from the storage device 110 and the like and sent to the printer unit 117 are signals wherein the entire page is colored in black, or the like.

Now, the amount of the substitution image data and flag data is a data amount equivalent to a tile size far smaller than the entire page, and accordingly can be kept from hoarding storage area in the storage device 110 or the like.

Figure 10:
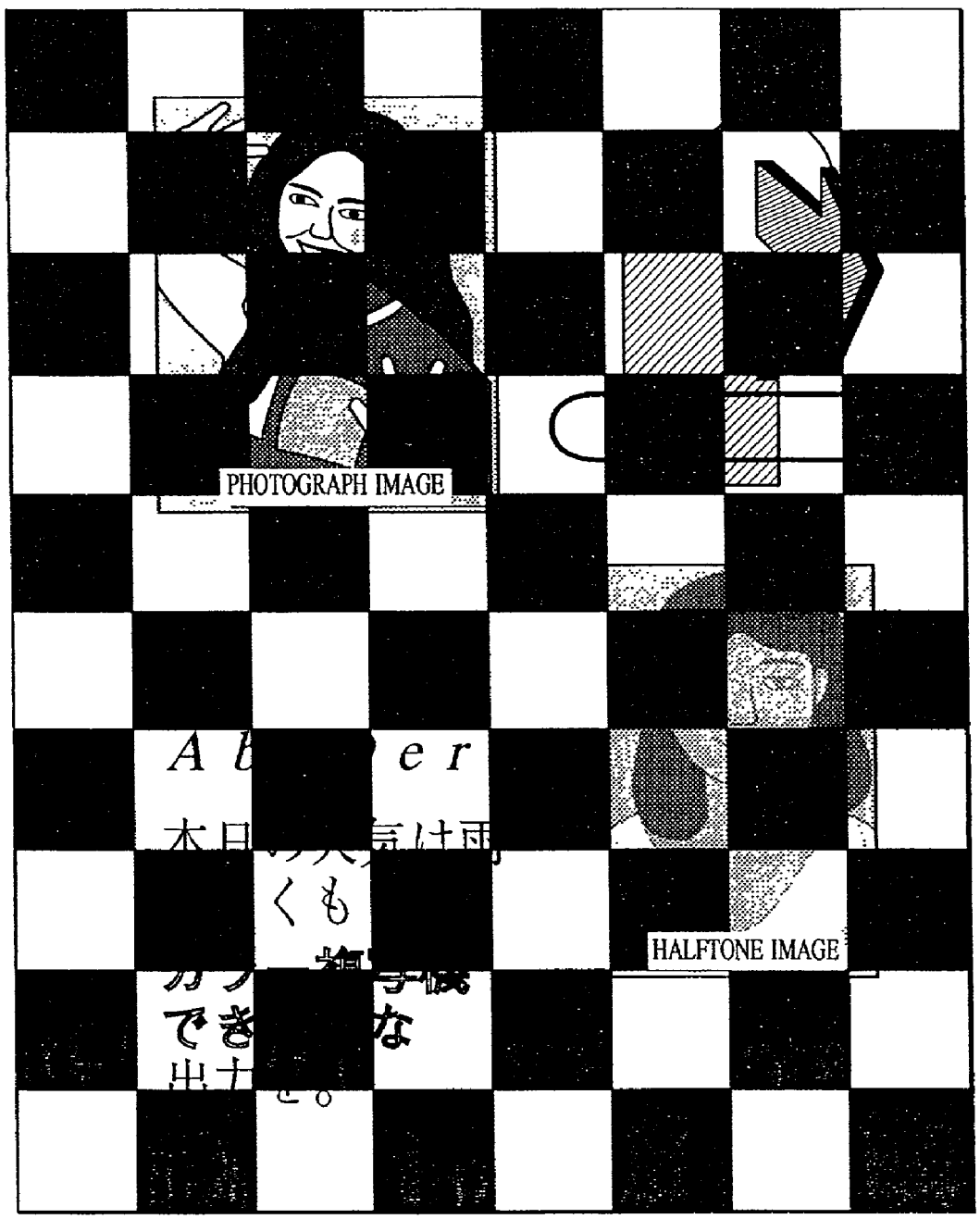
FIG. 10 is a diagram illustrating an output image example in the event that tiles making up one page are substituted in a checkered pattern.

Also, replacing with substitution image data does not need to be applied for all tiles, and may be carried out every other tile, for example. FIG. 10 is a diagram illustrating an output image example in the case of substituting the header information for corresponding tiles making up one page, so that substitution is carried out in a checkered pattern. This allows tiles to be colored in black while leaving a certain amount of the original information, which is effective in identifying what sort of specified a original was contained in the image that had been read. This is also effective in reducing consumption of coloring agent such as toner or the like.

According to the above-described embodiment, with an image processing device wherein image data read by scanning in original image is temporarily stored in output, in the event that judgement is made that the specified original image is contained, true reproduction of the original image is inhibited and unauthorized duplication is prevented beforehand, while allowing an image indicating the unauthorized activity to be printed out. Accordingly, the unauthorized activity can be brought to the attention of the individual attempting the unauthorized duplication, thereby effectively suppressing such unauthorized activity.

Second Embodiment

With the above-described embodiment, a case has been described wherein input image data is supplied from an image input device for digitally reading original images, but the image input means of the present invention are not restricted to such. With the second embodiment, a case will be described wherein data is printed out from a computer.

Figure 11:
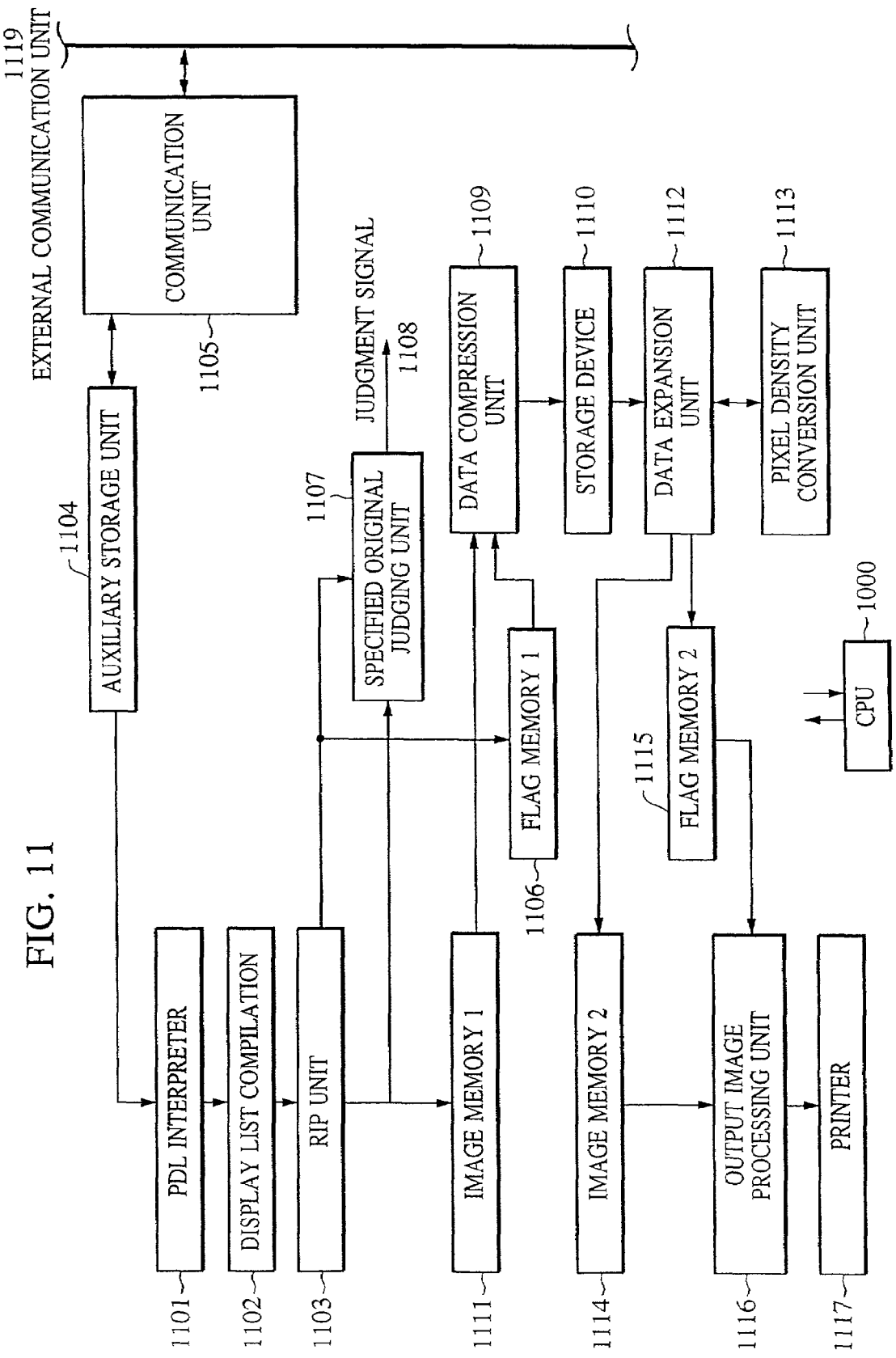
FIG. 11 is a block diagram illustrating a configuration example of an image processing device according to a second embodiment.

FIG. 11 is a block diagram illustrating an example of a configuration carrying out the present invention, in the case of a configuration wherein electronic document images created on a computer are printed out.

[Communication Interface Unit and Raster Data Generating Unit]

Document data to be printed is generally created with a certain application on an unshown personal computer.

The created document data is sent out onto a communication path 1119 such as a network as PDL data, via a printer driver within the computer.

Now, PDL is short for Page Description Language, and refers to a language system for describing the image of an entire page as a command format stipulated by components making up a document image. Well-known description language systems include PostScript (a registered trademark) LIPS (a registered trademark), PCL (a registered trademark), and so forth.

The PDL data that is sent out is received by a communication interface 1105 and temporarily stored in a auxiliary storage device 1104 such as a hard disk.

Upon completion of reception of one page of PDL data, a CPU 1000 transfers the received PDL data to a PDL interpreter unit 1101. The PDL interpreter converts the PDL commands described in a particular language into intermediate language data not dependent on the type of PDL language. Thus, the subsequent processing can be standardized regardless of what sort of description language the input PDL data is described with.

Next, the generated intermediate language data is converted into a display list for driving a subsequent RIP unit 1103, at a display list generating unit 1102. The RIP unit 1103 converts the display list into a raster image. RIP stands for Raster Image Processor, and has functions for generating image data as a collection of pixels as described with the first embodiment, in increments of rasters (lines), based on the input display list.

Normally, PDL data and intermediate language data are configured in increments of components making up the document, so there is the need to order the components so as to line up in increments of lines from the top of the page, in order to generate raster data at the RIP unit. The display list is the intermediate language data which is rearranged in the order of the components from the top of the page.

Following RIP processing, the raster data is 2-dimensional pixel arrayed data wherein color signals of the three colors R, G, and B, are arrayed in point sequence, in the same way as the image read by a scanner.

Also, an arrangement may be conceived wherein such RIP processing is performed on the computer creating the document data instead of the printer, and in such a case, the raster image data would be received from the communication interface unit 1105, temporarily stored in the auxiliary storage device 1104, and then handled as being equivalent to the output of the RIP unit 1103.

[Generating Attributes Flag Data]

With the RIP unit 1103, attributes flag data indicating that attributes of the image in increments of pixels can be generated at the same time as generating the raster image data.

As described with the first embodiment, the attributes flag data is used for subjecting each pixel of the document image to be output to optimal image processing, according to the characteristics thereof.

For example, a PDL document contains various types of image regions together, such as full-color photograph images with continuous gradation, text regions of black alone, lines and curves called vector objects, regions represented by shapes, and so forth.

As with the first embodiment, subjecting these image areas to the same image processing generally will not yield image output of desirable image quality.

The RIP unit 1103 shown in FIG. 11 generates attributes flag data based on one attributes information added to the input display list. For example, with regard to a part (object) input as text with the PDL command, information indicating text attributes is also provided on the display list, and a text flag is set for the attributes flag information corresponding to the pixels generated as text, at the time of rendering this display list as a raster image.

In the same way, photograph flags are set for photograph part regions, and vector flags are set for the vector object part regions.

Accordingly, the attributes flag information thus generated is reflected in the latter-described output image processing, so optimal image processing can be performed on each of the parts.

[Accumulation of Image Data]

The raster image data rendered at the RIP unit 1103, and the attributes flag data generated in the above procedures, are temporarily stored in first image memory 1111 and first flag memory 1106, respectively. At this time, the image data and the attributes flag data are stored for an entire page of the original, or a region portion of one page of a predetermined size.

The image data and attributes flag data are of a data format the same as that in the first embodiment, so subsequent processing is approximately the same as that in the first embodiment.

The temporarily stored image data and attributes flag data are compressed by a data compression unit 1109 and stored in a storage device 1110. The storage device 1110 is preferably a high-speed storing means such as a semiconductor storage device or the like. Also, the data compression unit 1109 performs a different data compression processing for the image data and attributes flag data. That is, image data is subjected to data compression processing such as JPEG compression, which is irreversible, but compresses data with a high compression percentage without perceivable deterioration of the image according to human visual properties, and the flag data preferably is subjected to reversible data compression such as JBIG decompression, so that there is no drop-out or change in the flag data.

Thus, the image data and flag data that have been subjected to different compression processing are stored in the storage device 1110 in increments of pages of the originals.

[Specified Original Judging Unit]

Concurrently with the above raster image generating and attributes flag generating processing, the specified original judging unit 1107 performs judgment regarding whether or not specified original images are contained in the raster image signals.

That is, simultaneously with the raster image data being sent to the first image memory (1111), this is also sent to the specified original judging unit 1107, judgement is made regarding whether or not an image regarding which reproduction is forbidden that has been registered beforehand is contained therein, judgment signals 1108 indicating the judgement results thereof are generated, and notified to an unshown CPU or the like.

As with the first embodiment, known technology can be used for the specified original judging method, wherein color attributes, 2-dimensional pattern attributes, etc., are extracted from the color image signals sent in time-sequence, the degree of approximation thereof with the color attributes, pattern attributes, etc., of specified original image is registered in the memory in the specified original judging unit 1107 beforehand (i.e., the degree of matching) is calculated, and in the event that the degree of approximation is at a predetermined value or higher, judgment results to the effect that a specified original image exists are output, while in the event that the degree of approximation is at a predetermined value or lower, judgment results to the effect that a specified original image does not exist are output.

Also, in this case, a processing method may be applied wherein and judgment of presence of specified originals is performed while making reference to the attributes flag information. In creating data on a computer as a PDL document, unauthorized image contained therein are often specified original image data such as paper currency of the like, read in with commercially-available flat-head scanner or the like. In such cases, "photograph" attributes are provided to the image attributes for the part of the specified original image. Accordingly, the specified original judging unit 1107 can make reference to the attributes flag information transferred from the RIP unit 1103, and makes the judging processing valid only in the event that a "photograph flag" is attached to the image data being judged.

Thus, erroneously judging the existence of a specified original by performing the judging processing for regions other than the photograph regions where unauthorized images exist, can be prevented.

Now, the specified original judgment processing and the raster image generation and storing are executed consecutively, meaning that presence or absence of a specified original is detected at the same time that the raster image generation is completed.

Accordingly, in the event that there is judgment that a specified original exists, the CPU 1000 instructs that the problem image data stored in the storage device 1110 be replaced with the second image data stored in the storage device 1110 beforehand.

The second image data here is image data wherein the entire page has been colored black (R=G=B=0). This can replace the data on the problem page that has been read in and stored, by being subjected to JPEG compression and stored in the storage device 1110 beforehand. The data size of the second image data is extremely small following JPEG compression, since the data has a uniform value for the entire page, and accordingly does not waste great amounts of space in the storage area.

The substitution processing performed here is the same as the method described in the first embodiment with reference to FIG. 4, so subsequent description will be omitted.

[Reading Out Image Data]

The compressed image data and attributes flag data stored in the storage device 1110 are read out for printing to the print unit 1117, each expanded at the data expanding unit 1112, and respectively written to the second image memory 1114 and second flag memory 1115.

At this time, the image data location information is saved in the page information described in the first embodiment is referred to in order to read out the actual image data. Accordingly, with regard to pages that have been judged to contain specified original images, the black image data is read out instead, and stored in the second image memory 1114.

Also, as with the first embodiment, the density conversion unit 1113 converts the pixel density of the image signals that have been read out from the storage device 1110, as necessary.

[Output of Image Data]

Upon the data amount of the image signals and flag data temporarily stored in the second image memory 1114 and second flag memory 1115 reaching a predetermined amount, the image signals and flag data are sent to an output image processing unit 1116.

The output image processing unit 1116 performs known image processing for converting the RGB image signals into printing image signals, i.e., luminance concentration conversion, RGB/CMYK conversion, binarization processing, etc., and the post-conversion CMYK image signals are output to the printer unit 1117. The printer unit 1117 performs laser driving based on the CMYK image signals sent thereto, and forms a visible image on the recording paper following the same procedures as those in the first embodiment.

The flag data stored in the second flag memory 1115 is used for switching over the processing of the output image processing unit 1116. That is, the coefficients for masking correction and RGB/CMYK conversion are changed between the photograph region and text region, thereby improving the output image quality. For example, a conversion coefficient wherein pixels are reproduced only with black toner is applied for text regions, i.e., for pixels wherein the text flag is "1", (in other words, a coefficient wherein C, M, and Y are 0), is applied for pixels wherein there is no color, and for the regions other than text region, coefficients are applied wherein C, M, and Y, are not 0 even in the event that there is no color, so as to reproduce a black with depth.

Also, binarization processing converts CMYK image signals into binary signals or the like of "0" and "1" using known error dispersion processing or dithering processing, and at this time, applying error dispersion processing for text regions and graph regions since the clarity of the output image has priority, and applying dithering processing for photographs and halftone regions since the gradation has priority, so as to execute binarization processing in the same manner as with the first embodiment, improves the output image quality by switching between quantization methods according to the flag data.

However, the configurations of the attribute flags are somewhat different, so the degree of freedom differs somewhat in the selection method for selecting, for example, the error dispersion processing for regions wherein the text flag or vector flag is 1.

Also, as described in the first embodiment, an arrangement may be made wherein the image is compressed in increments of tiles at the data compression unit 1109, and the substitution image is also substituted in increments of tiles. The specific processing thereof is the same as that of the first embodiment, and accordingly description thereof will be omitted.

Note that the present embodiment may be applied to a system configured of multiple devices (e.g., host computer, interface device, reader printer, etc.), or to a stand-alone device (e.g., a photocopier, facsimile device, etc.).

Also, it is needless to say that the objects of the present invention can be achieved by an arrangement wherein a storing medium (or recording medium) storing software program code for realizing the functions of the above embodiments is supplied to a system or device, and the program code stored in the storing medium is read out and executed by the computer (or CPU or MPU) of the system or device. In this case, the program code itself read out from the storing medium realizes the functions of the above-described embodiments, and the storing medium storing the program code comprises the present invention. Also, it is needless to say that the present invention encompasses cases not only where the computer executing the program code read out realizes the functions of the above embodiments, but also where the operating system or the like running on the computer executes part or all of the actual processing based on the instructions of the program code, thereby realizing the functions of the above-described embodiments.

Further, it is needless to say that the scope of the present invention also encompasses arrangements wherein the program code read out from the storing medium is written to memory provided to function expansion boards inserted into the computer or function expansion units connected to the computer, following which a CPU or the like provided to the function expansion board or function expansion unit performs all or part of the actual processing based on instructions of the program code, so as to realize the functions of the above-described embodiments thereby.

In the event that the present invention is applied to an above-described storing medium, the storing medium stores program code corresponding the above-described flowcharts.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing device comprising:
   a reading unit arranged to read an original image;
   first memory arranged to store a plurality of pages of images read by said reading unit;
   second memory arranged to store images to print from the images stored in said first memory;
   third memory arranged to store predetermined substitution images that are not dependent on an original image;
   a printer output unit arranged to output images stored in said second memory to a printer;
   a judging unit arranged to judge whether or not specified original images that are prohibited from being copied are contained in the images read by said reading unit; and
   a control unit arranged to store in said second memory a predetermined substitution image that is stored in said third memory, instead of an image of a page judged to contain said specified original images.

2. An image processing device according to claim 1, wherein said control unit repeatedly reads out the predetermined substitution image that is stored in said third memory, and stores it in said second memory.

3. An image processing device according to claim 1, further comprising:
   a data compression unit arranged to compress images; and
   a data expansion unit arranged to expand compressed images;
   wherein said first memory stores compressed images, and said second memory stores expanded images.

4. A control method for an image processing device, comprising:
   a reading step arranged to read an original image;
   a first storing step arranged to store a plurality of pages of images read in said reading step in first memory;
   a second storing step arranged to store images to print from the images stored in said first memory, in second memory;
   a third storing step arranged to store predetermined substitution images that are not dependent on an original image in third memory;
   an output step arranged to output images stored in said second memory to a printer;
   a judging step arranged to judge whether or not specified original images that are prohibited from being copied are contained in the images read in said reading step; and
   a substituting step arranged to store in said second memory a predetermined substitution image that is stored in said third memory, instead of an image of a page judged to contain said specified original images.

5. An image processing device, comprising:

a receiving unit arranged to receive print data from an external computer;

a rendering unit arranged to render print data received by said receiving unit as an image;

first memory arranged to store a plurality of pages of images rendered at said rendering unit;

second memory arranged to store an image for printing from images stored in said first memory;

third memory arranged to store predetermined substitution images that are not dependent on an original image;

a printer output unit arranged to output images stored in said second memory to a printer;

a judging unit arranged to judge whether or not specified original images that are prohibited from being copied are contained in the images rendered by said rendering unit; and a control unit arranged to store in said second memory predetermined substitution image that is a substitution image stored in said third memory, instead of an image of a page judged to contain said specified original image.

6. A control method for an image processing device, comprising:

a receiving step arranged to receive print data from an external computer;

a rendering step arranged to render print data received in said receiving step as an image;

a first storing step arranged to store in first memory a plurality of pages of images rendered in said rendering step;

a second storing step arranged to store in said second memory an image for printing from images stored in said first memory;

a third storing step arranged to store predetermined substitution images that images that are not dependent on a original image in third memory;

an output step arranged to output images stored in said second memory to a printer;

a judging step arranged to judge whether or not specified original images that are prohibited from being copied are contained in the images rendered in said rendering step; and a substituting step arranged to store in said second memory a predetermined substitution image that is stored in said third memory, instead of an image of a page judged to contain said specified original image.

* * * * *